(12) United States Patent
Barber et al.

(10) Patent No.: US 11,080,260 B2
(45) Date of Patent: *Aug. 3, 2021

(54) CONCURRENT READS AND INSERTS INTO A DATA STRUCTURE WITHOUT LATCHING OR WAITING BY READERS

(71) Applicant: INTERNATIONAL BUSINESS MACHINES CORPORATION, Armonk, NY (US)

(72) Inventors: Ronald J. Barber, San Jose, CA (US); Viktor Leis, Garching (DE); Guy M. Lohman, San Jose, CA (US); Vijayshankar Raman, Sunnyvale, CA (US); Richard S. Sidle, Ottawa (CA)

(73) Assignee: International Business Machines Corporation, Armonk, NY (US)

(*) Notice: Subject to any disclaimer, the term of this patent is extended or adjusted under 35 U.S.C. 154(b) by 518 days.

This patent is subject to a terminal disclaimer.

(21) Appl. No.: 16/048,060

(22) Filed: Jul. 27, 2018

(65) Prior Publication Data

US 2018/0336236 A1 Nov. 22, 2018

Related U.S. Application Data

(63) Continuation of application No. 14/671,664, filed on Mar. 27, 2015, now Pat. No. 10,108,653.

(51) Int. Cl.
*G06F 16/00* (2019.01)
*G06F 16/23* (2019.01)
(Continued)

(52) U.S. Cl.
CPC ........ *G06F 16/2336* (2019.01); *G06F 16/137* (2019.01); *G06F 16/182* (2019.01)

(58) Field of Classification Search
CPC .. G06F 16/137; G06F 16/182; G06F 16/2336; G06F 16/2246; G06F 16/2255; G06F 16/2272; G06F 16/2465
(Continued)

(56) References Cited

U.S. PATENT DOCUMENTS 5,455,826 A 10/1995 Ozveren et al.
5,598,559 A 1/1997 Chaudhuri
(Continued)

FOREIGN PATENT DOCUMENTS

CN 1522409 A 8/2004
CN 1968212 A 5/2007
(Continued)

OTHER PUBLICATIONS

List of IBM Patents or Patent Applications Treated as Related.
(Continued)

*Primary Examiner* — Vincent F Boccio
(74) *Attorney, Agent, or Firm* — Sherman IP LLP; Kenneth L. Sherman; Steven Laut

(57) ABSTRACT

A method includes performing, by a data structure processor, concurrent read and write operations into a hierarchical data structure that includes a mutable tier including extendible hashing, a hash table, and an immutable tier including a concise hash table (CHT) bitmap. Writers acquire latches on the hierarchical data structure elements that the latches modify. The hierarchical data structure elements are directly accessed by readers without acquiring latches. A modify operation is executed by a writer for one or more levels of the hierarchical data structure. When removed portions of the hierarchical data structure are no longer referenced, tracking is performed by use of a combination of a global state value and a copied local state value.

20 Claims, 10 Drawing Sheets

(51) Int. Cl.
  *G06F 16/13* (2019.01)
  *G06F 16/182* (2019.01)
(58) Field of Classification Search
  USPC .......................................................... 707/704
  See application file for complete search history.

(56) References Cited

U.S. PATENT DOCUMENTS

| | | |
|---|---|---|
| 5,706,495 A | 1/1998 | Chadha et al. |
| 5,740,440 A | 4/1998 | West |
| 5,794,229 A | 8/1998 | French |
| 5,893,086 A | 4/1999 | Schmuck et al. |
| 5,930,785 A | 7/1999 | Lohman et al. |
| 6,026,394 A | 2/2000 | Tsuchida et al. |
| 6,052,697 A | 4/2000 | Bennett |
| 6,134,601 A | 10/2000 | Spilo et al. |
| 6,247,014 B1 | 6/2001 | Ladwig et al. |
| 6,292,795 B1 | 9/2001 | Peters et al. |
| 6,505,189 B1 | 1/2003 | On Au et al. |
| 6,609,131 B1 | 8/2003 | Zait et al. |
| 6,757,677 B2 | 6/2004 | Pham et al. |
| 6,775,681 B1 | 8/2004 | Ballamkonda et al. |
| 6,937,652 B2 | 8/2005 | Gold et al. |
| 6,941,432 B2 | 9/2005 | Ronstrom |
| 6,954,776 B1 | 10/2005 | Cruanes et al. |
| 7,062,481 B2 | 6/2006 | Pham et al. |
| 7,136,883 B2 | 11/2006 | Flamma et al. |
| 7,177,883 B2 | 2/2007 | Yagawa |
| 7,287,131 B1 | 10/2007 | Martin et al. |
| 7,293,028 B2 | 11/2007 | Cha et al. |
| 7,308,539 B2 | 12/2007 | Fuhs et al. |
| 7,343,363 B1 | 3/2008 | Parker |
| 7,412,439 B2 | 8/2008 | Bossman et al. |
| 7,499,960 B2 | 3/2009 | Dageville et al. |
| 7,653,670 B2 | 1/2010 | Hasan et al. |
| 7,688,758 B2 | 3/2010 | Denby et al. |
| 7,716,180 B2 | 5/2010 | Vermeulen et al. |
| 7,827,182 B1 | 11/2010 | Panigrahy |
| 7,827,218 B1 | 11/2010 | Mittal |
| 7,868,789 B1 | 1/2011 | Binnig et al. |
| 8,078,593 B1 | 12/2011 | Ramarao et al. |
| 8,145,642 B2 | 3/2012 | Cruanes et al. |
| 8,195,644 B2 | 6/2012 | Xu |
| 8,271,564 B2 | 9/2012 | Dade |
| 8,321,385 B2 | 11/2012 | Burroughs et al. |
| 8,346,810 B2 | 1/2013 | Beaverson et al. |
| 8,370,316 B2 | 2/2013 | Bensberg et al. |
| 8,438,574 B1 | 5/2013 | Lyle et al. |
| 8,443,155 B2 | 5/2013 | Adams et al. |
| 8,661,005 B2 | 2/2014 | McKenney et al. |
| 8,692,695 B2 | 4/2014 | Fallon et al. |
| 8,768,889 B1 | 7/2014 | Martin |
| 8,768,927 B2 | 7/2014 | Yoon et al. |
| 8,832,025 B2 | 9/2014 | Arai et al. |
| 8,856,103 B2 | 10/2014 | Barber et al. |
| 8,886,614 B2 | 11/2014 | Morris |
| 9,092,141 B2 | 7/2015 | Hayashi et al. |
| 9,098,201 B2 | 8/2015 | Benjamin et al. |
| 9,298,723 B1 | 3/2016 | Vincent |
| 9,355,060 B1 | 5/2016 | Barber et al. |
| 9,430,390 B2 | 8/2016 | Mukherjee et al. |
| 9,436,558 B1 | 9/2016 | Per et al. |
| 9,454,560 B2 | 9/2016 | Cha et al. |
| 9,626,421 B2 | 4/2017 | Plattner et al. |
| 9,684,682 B2 | 6/2017 | Mukherjee et al. |
| 9,792,318 B2 | 10/2017 | Schreter et al. |
| 10,108,653 B2 * | 10/2018 | Barber .................. G06F 16/182 |
| 2001/0039609 A1 | 11/2001 | Houldsworth et al. |
| 2002/0016820 A1 | 2/2002 | DuVal et al. |
| 2004/0260684 A1 | 12/2004 | Agrawal et al. |
| 2005/0018683 A1 | 1/2005 | Zaho et al. |
| 2005/0033741 A1 | 2/2005 | Dombroski et al. |
| 2006/0218176 A1 | 9/2006 | Sun Hsu et al. |
| 2007/0136317 A1 | 6/2007 | Przywara |
| 2007/0208788 A1 | 9/2007 | Chakravarty et al. |
| 2007/0244850 A1 | 10/2007 | Hoppe et al. |
| 2007/0245119 A1 | 10/2007 | Hoppe |
| 2008/0126706 A1 | 5/2008 | Newport et al. |
| 2008/0133583 A1 | 6/2008 | Artan et al. |
| 2008/0162402 A1 | 7/2008 | Holmes et al. |
| 2009/0006399 A1 | 1/2009 | Raman et al. |
| 2009/0024568 A1 | 1/2009 | Al-Omari et al. |
| 2009/0100223 A1 | 4/2009 | Murayama et al. |
| 2009/0187586 A1 | 7/2009 | Olson |
| 2009/0210445 A1 | 8/2009 | Draese et al. |
| 2009/0222659 A1 | 9/2009 | Miyabayashi et al. |
| 2010/0088309 A1 | 4/2010 | Petculescu et al. |
| 2010/0114868 A1 | 5/2010 | Beavin et al. |
| 2010/0131540 A1 | 5/2010 | Xu |
| 2010/0199066 A1 | 8/2010 | Artan et al. |
| 2010/0223253 A1 | 9/2010 | Gopal et al. |
| 2011/0060876 A1 | 3/2011 | Liu |
| 2011/0066593 A1 | 3/2011 | Ahluwalia et al. |
| 2011/0078134 A1 | 3/2011 | Bendel et al. |
| 2011/0107021 A1 | 5/2011 | Muthukumarasamy et al. |
| 2011/0283082 A1 | 11/2011 | McKenney et al. |
| 2011/0307471 A1 | 12/2011 | Sheinin |
| 2012/0011133 A1 | 1/2012 | Faerber et al. |
| 2012/0011144 A1 | 1/2012 | Transier et al. |
| 2012/0036134 A1 | 2/2012 | Malakhov |
| 2012/0117055 A1 | 5/2012 | Al-Omari et al. |
| 2012/0136846 A1 | 5/2012 | Song et al. |
| 2012/0136889 A1 | 5/2012 | Jagannathan et al. |
| 2012/0143877 A1 | 6/2012 | Kumar et al. |
| 2012/0158729 A1 | 6/2012 | Mital et al. |
| 2012/0166400 A1 | 6/2012 | Sinclair et al. |
| 2012/0173517 A1 | 7/2012 | Lang et al. |
| 2012/0260349 A1 | 10/2012 | Nagai et al. |
| 2012/0303633 A1 | 11/2012 | He et al. |
| 2012/0310917 A1 | 12/2012 | Sheinin et al. |
| 2012/0331249 A1 | 12/2012 | Benjamin et al. |
| 2013/0046949 A1 | 2/2013 | Colgrove et al. |
| 2013/0138628 A1 | 5/2013 | Bensberg et al. |
| 2013/0218934 A1 | 8/2013 | Lin et al. |
| 2013/0325900 A1 | 12/2013 | Barber et al. |
| 2014/0006379 A1 | 1/2014 | Arndt et al. |
| 2014/0025648 A1 | 1/2014 | Corbett et al. |
| 2014/0074819 A1 | 3/2014 | Idicula |
| 2014/0108489 A1 | 4/2014 | Glines et al. |
| 2014/0129568 A1 | 5/2014 | Kim et al. |
| 2014/0181052 A1 | 6/2014 | Moore et al. |
| 2014/0214795 A1 | 7/2014 | Attaluri et al. |
| 2014/0215019 A1 | 7/2014 | Ahrens |
| 2014/0337375 A1 | 11/2014 | Yue |
| 2014/0372388 A1 | 12/2014 | Attaluri et al. |
| 2015/0058293 A1 | 2/2015 | Kobayashi et al. |
| 2015/0088813 A1 | 3/2015 | Lahiri et al. |
| 2015/0301743 A1 | 10/2015 | Nagao et al. |
| 2016/0147457 A1 | 5/2016 | Legler et al. |
| 2016/0232169 A1 | 8/2016 | Archak et al. |

FOREIGN PATENT DOCUMENTS

| | | |
|---|---|---|
| CN | 101013427 A1 | 8/2007 |
| CN | 101067822 A1 | 11/2007 |
| CN | 1003672239 C | 2/2008 |
| CN | 101231657 A | 7/2008 |
| CN | 101388042 A | 3/2009 |
| CN | 101573760 A | 11/2009 |
| CN | 101828182 A | 9/2010 |
| CN | 102893265 A | 1/2013 |
| CN | 103635902 A | 3/2014 |
| CN | 104021205 A | 9/2014 |
| CN | 104317966 A | 1/2015 |
| EP | 0457707 A2 | 11/1991 |
| EP | 2811411 A1 | 12/2014 |
| JP | 2007234026 A | 9/2007 |
| JP | 2010539616 A | 12/2012 |
| JP | 2013222457 A | 10/2013 |
| WO | 2011148496 | 12/2011 |
| WO | 2013141308 A | 9/2013 |
| WO | 2014010038 A | 1/2014 |

(56) References Cited

FOREIGN PATENT DOCUMENTS

| | | |
|---|---|---|
| WO | 2014045441 A | 3/2014 |
| WO | 2015078136 A1 | 6/2015 |

OTHER PUBLICATIONS

Gao, H. et al., "Lock-free dynamic hash tables with open addressing", Journal of Distributed Computing, Jul. 2005, pp. 21-42, vol. 18, Issue 1, United Kingdom.
Sewall, J. et al., "PALM: Parallel Architecture-Friendly Latch-Free Modifications to B+ Trees on Many-Core Processors", Proceedings of the 37th International Conference on Very Large Data Bases (VLDB Endowment), Aug. 29-Sep. 3, 2011, pp. 795-806, vol. 4, No. 11, United States.
Pandis, I. et al., "PLP: Page Latch-free Shared-everything OLTP", Proceedings of the 37th International Conference on Very Large Data Bases (VLDB Endowment), Aug. 29-Sep. 3, 2011, pp. 610-621, vol. 4, No. 10, United States.
Areias, M. et al., "A Simple and Efficient Lock-Free Hash Trie Design for Concurrent Tabling", Theory and Practice of Logic Programming, May 14, 2014, pp. 1-10, Arxiv.org, Cornell University Library, United States.
Prokopec, A. et al., "Lock-Free Resizeable Concurrent Tries", Languages and Compilers for Parallel Computing, 2013, pp. 156-170, vol. 7146, Springer Berlin Heidelberg, Germany.
Levandoski, J., et al., "The Bw-Tree: a B-tree for New Hardware Platforms", IEEE 29th International Conference on Data Engineering (ICDE), Apr. 8, 2013, pp. 1-12, IEEE, United States.
Leis, V., et al., "The Adaptive Radix Tree: ARTful Indexing for Main-Memory Databases", IEEE 29th International Conference on Data Engineering (ICDE), Apr. 8, 2013, pp. 38-49, IEEE, United States.
Lehman, T.J. "Design and Performance Evaluation of a Main Memory Relational Database System." 1986, PhD Dissertation, 334 pages, [Abstract Only], University of Washington, Madison, WI.
Mell, P., et al., "The NIST Definition of Cloud Computing", National Institute of Standards and Technology Special Publication 800-145, Sep. 2011, pp. 1-7, U.S. Department of Commerce, United States.
Marek, R., et al., "TID Hash Joins," CIKM, 1994, pp. 42-49, Gaithersburg, MD, United States.
Chang. S., "Recent Advances of Compact Hashing for Large-Scale Visual Search", Columbia University, Oct. 2012, pp. 1-44, United States.
Wang, W., et al.; "Investigating Memory Optimization of Hash-index for Next Generation Sequencing on Multi-core Architecture", IPDPSW IEEE 26th Inter. Conf., May 21-25, 2012, pp. 665-674, IEEE Computer Society, United States.
Cutt, B., et al.; "Improving Join Performance for Skewed Databases", IEEE, 2008, pp. 1-5, United States.
Li, Q., et al.; "Adaptively Reordering Joins during Query Execution", IEEE, 2007, pp. 26-35, United States.
Cleary, J.G., "Compact Hash Tables Using Bidirectional Linear Probing", IEEE Transactions on Computers, Sep. 1994, pp. 828-834, vol. C-33, No. 9, United States.
Nan Hua. H., et al., "Rank-Indexed Hashing: a Compact Construction of Bloom Filters and Variants", IEEE, 2008, pp. 73-82, United States.
Xu, Y., "A Multi-Dimesional Progressive Perfect Hashing for High-Speed String Matching", Seventh ACM/ IEEE Symposium on Architectures for Networking and Communications Systems, 2011, pp. 167-177, IEEE Computer Society, United States.
U.S. Appl. No. 14/509,336, "Embracing and Exploiting Data Skew During a Join or Groupby", filed Oct. 8, 2014, 38 pages, United States.
Anonymous, "System and Method for Usage Aware Row Storage in Database Systems", Jul. 23, 2010, pp. 1-4, ip.com, United States.
Anonymous, "High Performance Technique Using Join Collocation in a Massively Parallel Processing Relational Database Implementation", Jun. 14, 2012, pp. 1-5, IP.com, United States.
Anonymous, "CashMap: Processor Cache-Aware Implementation of Hash Tables", Jul. 5, 2013, pp. 1-7, IP.com, United States.
Anonymous, "Efficient Grouping Over Joins of Compressed Tables", Apr. 6, 2010, pp. 1-6, IP.com, United States.
Internet Society, et al., "The VCDIFF Generic Differencing and Compression Data Format (RFC3284)", Jul. 1, 2002, pp. 1-31, Network Working Group, IP.com, United States.
Hu, K. et al. "Rapid multi-dimension hierarchical algorithm in data warehouse system", Computer Integrated Manufacturing Systems, Jan. 2007, p. 196-201, vol. 13, No. 1, China.
Raman, V., et al., "DB2 with BLU Acceleration: so Much More than Just a Column Store", Proceedings of the VLDB Endowment, Aug. 2013, pp. 1-12, vol. 6, No. 11, ACM, United States.
Spyros, B., et al., "Design and Evaluation of Main Memory Hash Join Algorithms for Multi-core CPUs", SIGMOD Int'l Conference on Management of Data, Jun. 12, 2011, pp. 1-12, ACM, United States.
Korn, D., et al., "The VCDIFF Generic Differencing and Compression Data Format (RFC3284)", Jul. 1, 2002, pp. 1-31, Network Working Group, IP.com, United States.
Yan, Weipeng P. et al., "Performing Group-By before Join [query processing]," Proceedings 1oth International Conference on Data Engineering, 1994, pp. 89-100, IEEE, 1994.
List of IBM Patents or Applications Treated as Related; Attaluri, G.K., U.S. Appl. No. 16/427,190, filed May 30, 2019.
Chinese Office Action dated Feb. 12, 2019 for Chinese Patent Application No. 201610177904.0 from Chinese Patent Office, pp. 1-8, Beijing, China.
Chinese Office Action dated Dec. 5, 2018 for Chinese Patent Application No. 201610177904.0 from ChinesePatent Office, pp. 1-15, Beijing, China.
Japanese Office Action dated Sep. 3, 2019 for Japanese Patent Application No. 2017545567 from Japan Patent Office, pp. 1-8, Tokyo, Japan.
Chinese Office Action dated Apr. 3, 2020 for Chinese Patent Application No. 201680015687.3 from China Patent Office, pp. 1-9, Beijing, China.

* cited by examiner

US 11,080,260 B2

CONCURRENT READS AND INSERTS INTO A DATA STRUCTURE WITHOUT LATCHING OR WAITING BY READERS

BACKGROUND

There is an increasing trend towards doing business intelligence (BI) queries on real-time data in databases or tabled data. Traditionally, there is a strict separation between BI systems and online transaction processing (OLTP) systems. There is increasing market pressure for operational BI, and for both transactions and analytics to be performed on the same database.

Dictionaries (data structures supporting lookups and inserts and possibly deletes/updates) are often organized hierarchically. These dictionaries perform poorly on multi-core machines because readers have to acquire read latches to prevent concurrent writers from possibly corrupting or freeing parts of the data structure that they are reading.

SUMMARY

One or more embodiments relate to use of hierarchical data structures that do not require readers to acquire latches, while writers acquire write latches. One embodiment includes a method that includes performing, by a data structure processor, concurrent read and write operations into a hierarchical data structure that includes a mutable tier including extendible hashing, a hash table, and an immutable tier including a concise hash table (CHT) bitmap. Writers acquire latches on the hierarchical data structure elements that the latches modify. The hierarchical data structure elements are directly accessed by readers without acquiring latches. A modify operation is executed by a writer for one or more levels of the hierarchical data structure. When removed portions of the hierarchical data structure are no longer referenced, tracking is performed by use of a combination of a global state value and a copied local state value.

These and other features, aspects and advantages of the embodiments will become understood with reference to the following description, appended claims and accompanying figures.

DETAILED DESCRIPTION

Figure 1:
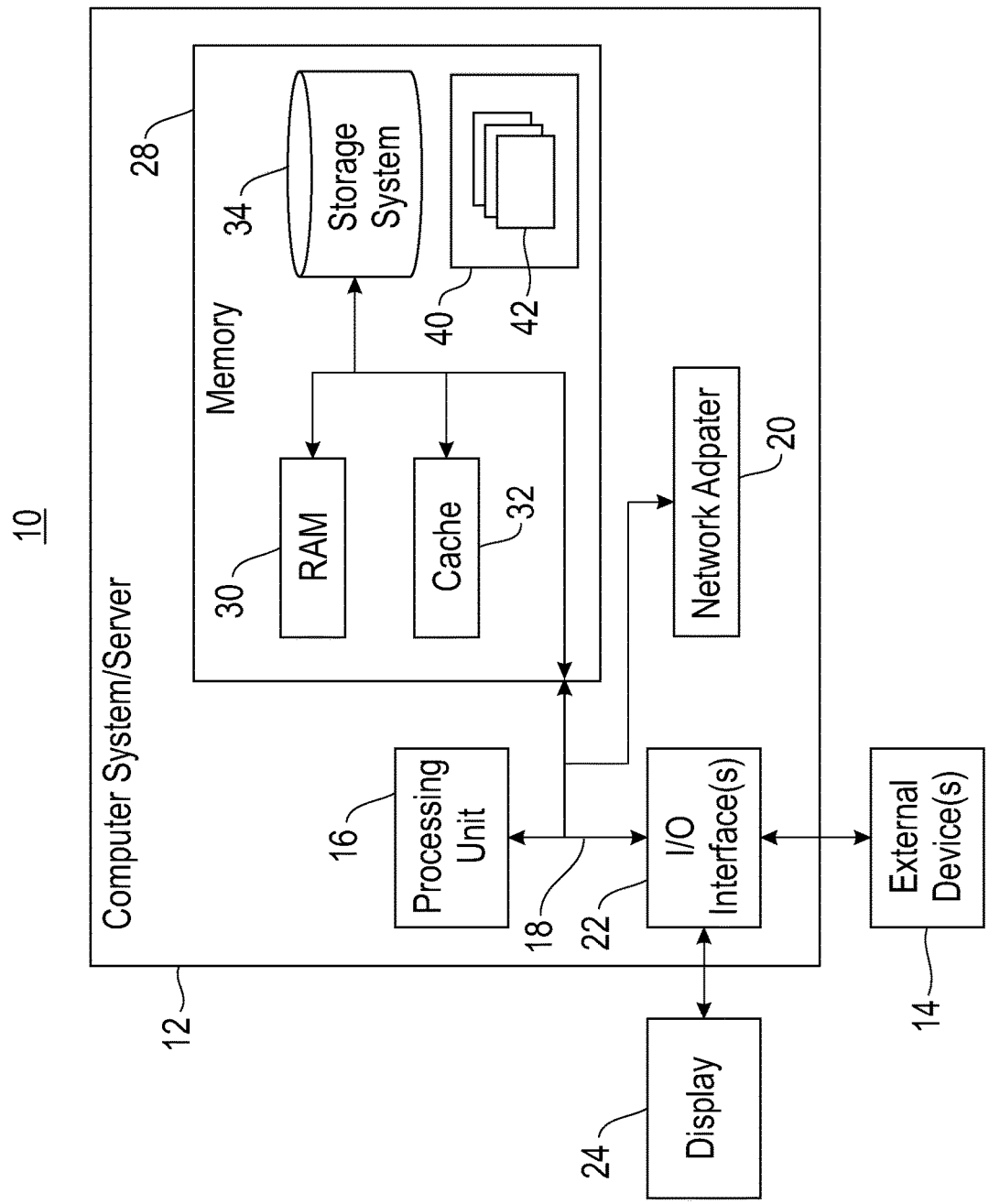
FIG. 1 depicts a cloud computing node, according to an embodiment.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is understood in advance that although this disclosure includes a detailed description of cloud computing, implementation of the teachings recited herein are not limited to a cloud computing environment. Rather, the embodiments are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines (VMs), and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed and automatically, without requiring human interaction with the service's provider.

Broad network access: capabilities are available over a network and accessed through standard mechanisms that promote use by heterogeneous, thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or data center).

Rapid elasticity: capabilities can be rapidly and elastically provisioned and, in some cases, automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active consumer accounts). Resource usage can be monitored, controlled, and reported, thereby providing transparency for both the provider and consumer of the utilized service.

Service Models are as Follows:

Software as a Service (SaaS): the capability provided to the consumer is the ability to use the provider's applications running on a cloud infrastructure. The applications are accessible from various client devices through a thin client interface, such as a web browser (e.g., web-based email). The consumer does not manage or control the underlying cloud infrastructure including network, servers, operating systems, storage, or even individual application capabilities, with the possible exception of limited consumer-specific application configuration settings.

Platform as a Service (PaaS): the capability provided to the consumer is the ability to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application-hosting environment configurations.

Infrastructure as a Service (IaaS): the capability provided to the consumer is the ability to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is a service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of the embodiments described herein. Regardless, cloud computing node 10 is capable of being implemented and/or performing any of the functionality set forth hereinabove.

In cloud computing node 10, there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set-top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media, including memory storage devices.

As shown in FIG. 1, computer system/server 12 in cloud computing node 10 is shown in the form of a general purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example and not limitation, such architectures include a(n) Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile/non-volatile media, and removable/non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, a storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM, or other optical media can be provided. In such instances, each can be connected to bus 18 by one or more data media interfaces. As will be further depicted and described below, memory 28 may include at least one program product having a set (e.g., at least one) of program modules that are configured to carry out the functions of the embodiments.

Program/utility 40, having a set (at least one) of program modules 42, may be stored in a memory 28 by way of example and not limitation, as well as an operating system, one or more application programs, other program modules, and program data. Each of the operating systems, one or more application programs, other program modules, and program data or some combination thereof, may include an implementation of a networking environment. Program modules 42 generally carry out the functions and/or methodologies of the embodiments as described herein.

Computer system/server 12 may also communicate with one or more external devices 14, such as a keyboard, a pointing device, etc.; a display 24; one or more devices that enable a consumer to interact with computer system/server 12; and/or any devices (e.g., network card, modem, etc.) that enable computer system/server 12 to communicate with one or more other computing devices. Such communication can occur via I/O interfaces 22. Still yet, computer system/server 12 can communicate with one or more networks, such as a local area network (LAN), a general wide area network (WAN), and/or a public network (e.g., the Internet) via a network adapter 20. As depicted, the network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, data archival storage systems, etc.

Figure 2:
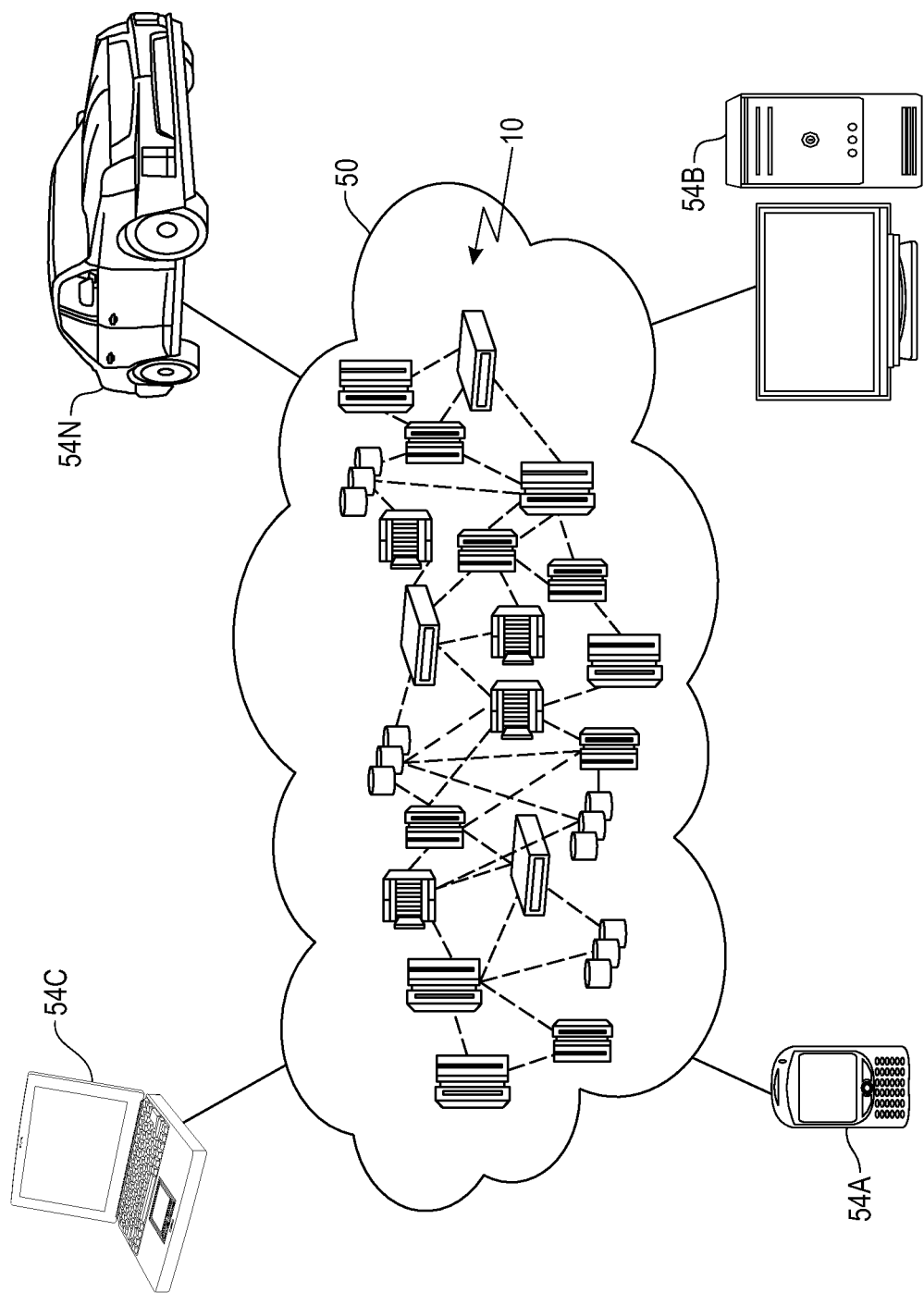
FIG. 2 depicts a cloud computing environment, according to an embodiment.

Referring now to FIG. 2, an illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as private, community, public, or hybrid clouds as described hereinabove, or a combination thereof. This allows the cloud computing environment 50 to offer infrastructure, platforms, and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
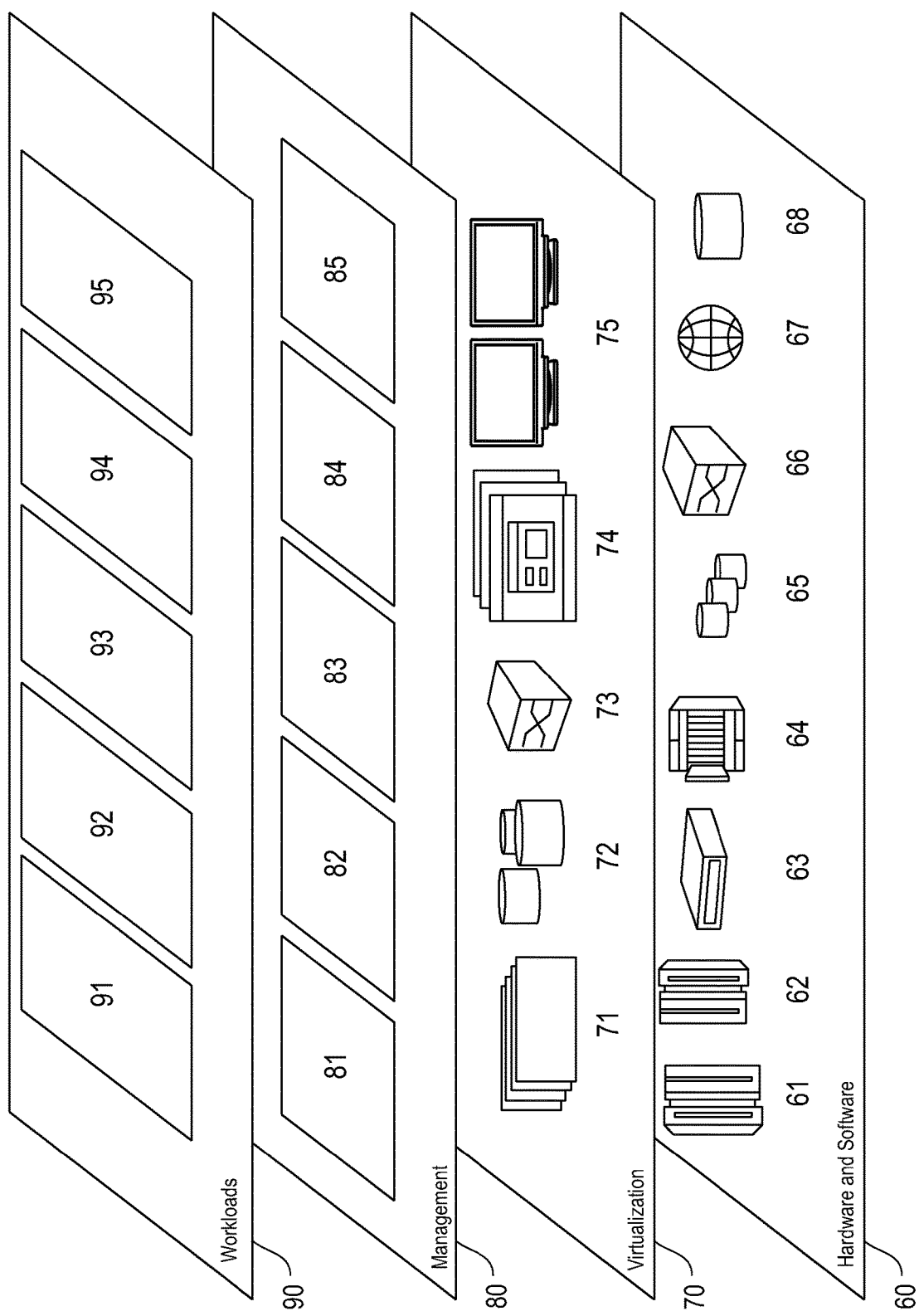
FIG. 3 depicts a set of abstraction model layers, according to an embodiment.

Referring now to FIG. 3, a set of functional abstraction layers provided by the cloud computing environment 50 (FIG. 2) is shown. It should be understood in advance that the components, layers, and functions shown in FIG. 3 are intended to be illustrative only and the embodiments are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, a management layer 80 may provide the functions described below. Resource provisioning 81 provides dynamic procurement of computing resources and other resources that are utilized to perform tasks within the cloud computing environment. Metering and pricing 82 provide cost tracking as resources are utilized within the cloud computing environment and billing or invoicing for consumption of these resources. In one example, these resources may comprise application software licenses. Security provides identity verification for cloud consumers and tasks as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; and transaction processing 95. As mentioned above, all of the foregoing examples described with respect to FIG. 3 are illustrative only, and the embodiments are not limited to these examples.

It is understood all functions of one or more embodiments as described herein may be typically performed by the server 12 (FIG. 4), which can be tangibly embodied as modules of program code 42 of program/utility 40 (FIG. 1). However, this need not be the case. Rather, the functionality recited herein could be carried out/implemented and/or enabled by any of the layers 60, 70, 80 and 90 shown in FIG. 3.

It is reiterated that although this disclosure includes a detailed description on cloud computing, implementation of the teachings recited herein are not limited to a cloud computing environment. Rather, the embodiments may be implemented with any type of clustered computing environment now known or later developed.

One or more embodiments relate to data structure processing using hierarchical data structures that do not require readers to acquire latches, while writes acquire write latches. One embodiment includes a method that includes performing, by a data structure processor, concurrent read and write operations into a hierarchical data structure. Writers acquire latches on the hierarchical data structure elements that the writers modify. The hierarchical data structure elements are directly accessed by readers without acquiring latches. A modify operation is executed by a writer for one or more levels of the hierarchical data structure. When removed portions of the hierarchical data structure are no longer referenced, tracking is performed by use of a combination of a global state value and a copied local state value. The global state value transitions through a non-repeating sequence of values. No longer referenced portions of the hierarchical data structure are tagged with the current global state value.

In one embodiment, writers acquire write latches, but readers do not acquire latches—not even for atomic operations, such as compare-and-swap (CSWP) or atomic increments. In one example, hierarchical data structures are implemented, and each step of the hierarchical data structure permits readers to access data without having to wait for the acquisition of typical concurrency mechanisms, such as latches, semaphores, or locks.

A hash table (HT) is made up of two parts: an array (the actual table where the data to be searched is stored) and a mapping function, known as a hash function. With a hash table, any value may be used as an index, such as a floating-point value, a string, another array, or even a structure as the index. This index is called the key, and the contents of the array element at that index is called the value. Therefore, an HT is a data structure that stores key/value pairs and can be quickly searched by the key. The hash function is a mapping from the input space to the integer space that defines the indices of the array. The hash function provides a way for assigning numbers to the input data such that the data can then be stored at the array index corresponding to the assigned number.

In one embodiment, the index maps hash values to a set of tuple sequence numbers (TSNs, also referred to as a tuple or row identifier). Neither the key (only its hash value) nor any other attributes are stored in the index itself. This approach also reflects main-memory and OLTP optimized design, where having a clustered index is of little benefit. Not storing any keys or attributes in the index allows index pages to have the same layout in memory, independent of their types. One embodiment supports systems that use multi-version concurrency control, and both row and column-wise storage. In one example, the index has the following interface:

uint64 lookup(uint64 hash, uint64*resultBuffer, uint64 resultBufferSize)
    insert(uint64 hash, uint64 tsn)
    delete(uint64 hash, uint64 tsn).

In one embodiment, the lookup function takes a hash value, a result buffer, and its maximum size as input parameters. The return value is the number of TSNs found for the desired hash key. If the result buffer is too small, the caller must allocate a larger buffer and retry the lookup. The lookup and delete functions both take a hash value and a TSN. This interface allows the index to be used for unique and non-unique indexes.

Figure 4:
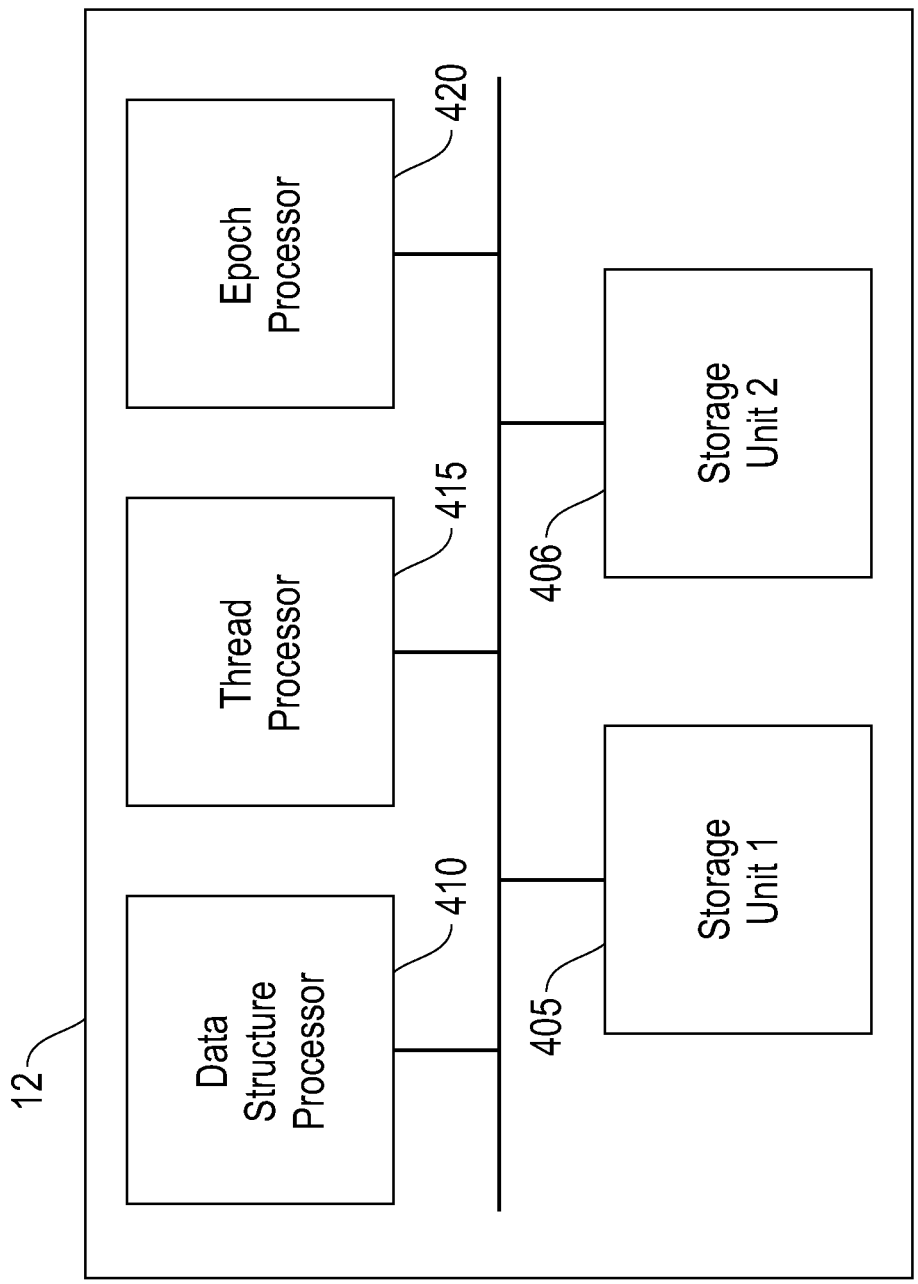
FIG. 4 is a block diagram illustrating a system for concurrent read and write operations for hierarchical data structure elements, according to an embodiment.

FIG. 4 is a block diagram illustrating a system 400 for concurrent read and write operations for hierarchical data structure elements, according to an embodiment. In one embodiment, the system 400 includes a server 12 including a storage unit 1 405 through storage unit N 406 (where N is an integer greater than 1), a data structure processor 410, a thread processor 415, and an epoch processor 420. In one embodiment, the storage units 1-N 405-406 may be external to the server 12. In one embodiment, the storage units 1-N 405-406 may store objects, such as rows/columns/individual values, tables, etc. In a relational database, a table (or file) organizes the information about a single topic into rows and columns. In one embodiment, the storage units 1-N 405-406 may include different types of memory storage, such as a buffer pool, cloud based storage, different types of objects pools, etc.

In one embodiment, the data structure processor 410 performs processing on a hierarchical data structure that includes parent nodes and their respective child nodes. The thread processor 415 provides thread processing that includes managing operations/threads, executing operations/threads, terminating operations/threads, etc. In one embodiment, the epoch processor maintains a global atomic counter (e.g., a 64 bit counter) that stores the current global epoch value. The fact that writers cannot exclude concurrent read accesses causes a problem when a page needs to be freed (e.g., after a split). Even after removing the pointer in the index to a page, a writer can never be certain when it is safe to free this page, because there may still be readers on that page. The key idea of epochs is that if each index operation had a beginning-of-operation timestamp, memory reclamation could free all memory pages that are older than the oldest operation in the system. Acquiring a precise time for each index operation would of course be too expensive, which is why the epoch approach uses a more coarse time granularity, called "epoch."

In one embodiment, epoch processor 420 increments the global epoch counter using a periodic timer (e.g., every 1 ms, 10 ms, etc.). In one embodiment, the epoch processor 420 communicates with the thread processor 415 such that each operation/thread maintains a local epoch counter. The local epoch counter stores a copy of global epoch value, which prevents reclamation of any page in this or newer epochs. A unique local epoch value indicating infinity may be used to signify that an operation/thread is not accessing any pages at the moment. In one example, an operation/thread publishes the intention to access pages by storing the local epoch value to a memory location that is only written to by the operation/thread, but can be read by all operations/threads.

In one embodiment, the data structure processor 410 performs modify operations that are local to a child node. In one example, if the modify is local to the child node, the modify operation is directly performed using a reader-wait-free protocol. In one example, a linked list inside the child node may be implemented, where the modifier inserts new entries to the list by atomically modifying linked list next pointers. In one embodiment, delete operations are performed logically by the data structure processor. It should be noted that in one embodiment, the modifier does acquire a latch to prevent a concurrent modify to the same child node.

In one embodiment, the data structure processor 410 performs a modify operation on a child node that needs to split the child node. At times, a modify operation on a child node may cause it to grow beyond its physical enclosure, and the child node needs to be split into two children nodes. In one example, the data structure processor 410 performs the split, forming two separate children nodes (leaving the old node existing because readers may still be using it), and then replacing that child node with the two split children nodes in the parent node via extendible hashing. It should be noted that the modifier does acquire a modify latch on both the child node and the parent node.

In one embodiment, the data structure processor 410 performs a modify operation on the parent node. This is typically needed when the extendible hashing procedure needs to resize the parent node itself. In one example, the parent node is latched for modify and the data structure processor 410 performs the resize.

In one embodiment, the data structure processor 410 performs a modify operation on a child node that needs to transform that child. In one example, a child node is merged into a larger data structure that does not have the same physical size limits. In one embodiment, the data structure processor 410 first forms a new empty child node and places the new child node before the full child node in a linked list. In one example, the insertion is performed by an atomic replacement of the pointer from the parent node. The empty child node allows readers to continue throughout the modify operation.

In one embodiment, concurrent inserters can also continue as soon as the empty child node has been added. In one example, when the thread processor 415 has one operation/thread executing a modify operation on a child node that needs to transform that child node, concurrent modifiers will be waiting on the modify latch. The concurrent modifiers need to be redirected to go against the empty child node. In one example, the concurrent modifiers are made to restart from scratch if they detect that the child node data structure they are waiting on has been merged.

In one embodiment, for reclaiming space, the no-wait-for-reader data structures make new copies to allow the writers and readers to proceed concurrently. If the server 12 waits for all readers to finish by maintaining a reference count, all readers have to pay for maintaining a reference count, which scales poorly. In one embodiment, the epoch processor 420 provides an epoch scheme. In one example, each operation/thread may have a possibly stale local copy of the epoch counter. Each operation/thread updates its local epoch counter copy at the start of each operation (or once per batch of operations) and when no pointers into the protected structure are cached locally. In one embodiment, when a version of the child node is modified and becomes old i.e., unused by the data structure, the value of the global epoch counter is recorded. The version can be freed after all other operations/threads have progressed past this epoch value (i.e. their local stale copies are greater than this epoch). In one example, the epoch value check is performed occasionally by the epoch processor 420, either upon memory pressure or at periodic intervals.

Figure 5:
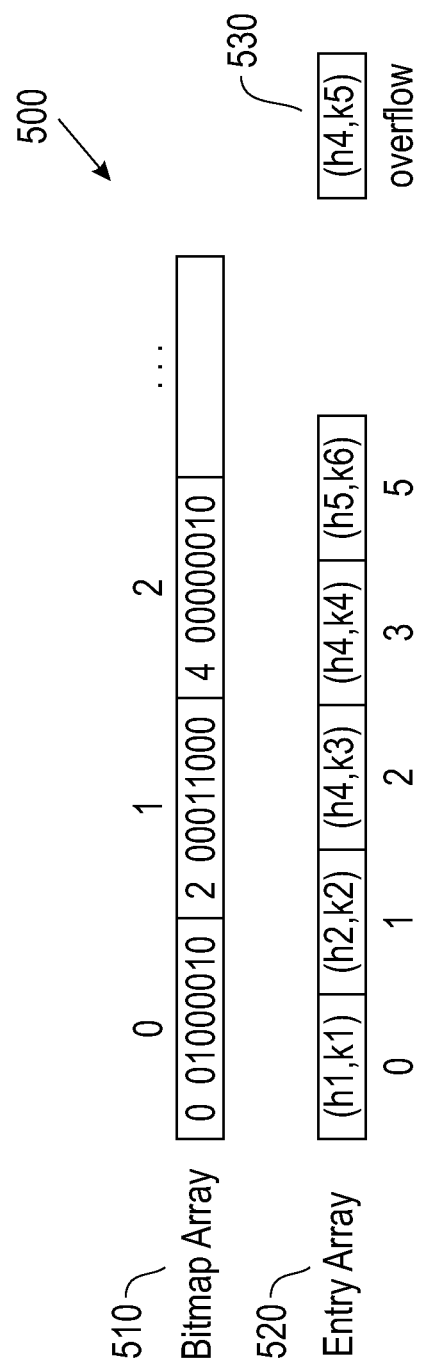
FIG. 5 illustrates a concise hash table (CHT) that may be implemented by an embodiment.

FIG. 5 illustrates a concise hash table (CHT) 500 that may be modified by an embodiment. The CHT 500 as a compact data structure. The CHT 500 achieves space efficiency by storing entries in a dense, and mostly sorted array. In one example, the CHT 500 includes a bitmap array 510, an entry array 520 for the actual values, and an overflow data structure 530 (e.g., a different kind of hash table). The bitmap array 510 is sized such that about 1 in 8 bits are set, and is split into buckets storing 32 bits (e.g., for graphical reasons 8 bits per bucket are used in the example). By looking at an appropriate number of hash bits of an entry one can determine its bit position in the array. Conceptually, its position in the entry array can then be computed by adding up the number of bits set (population count) left to its position. Since it is not practical to actually compute the population count over many buckets on every lookup, prefix population counts are interleaved with the bitmap array. In the example, the prefix population for the bucket 2 is 4, because the bucket 0 and the bucket 1 both have 2 entries in the entry array 520. This allows to quickly find the likely position of an entry. In case of a hash collision (e.g., h4 in the example), the neighboring bit (and therefore also position) is used. However, if more than two entries hash to the same bit position, these entries must be stored in a separate data structure, as shown in the example for h4.

The original CHT 500 data structure was designed for space-efficient in-memory hash joins. Therefore, both the bitmap array 510 structure and the entry array 520 are simply large arrays. Since the index is arranged on fixed-sized pages, in one embodiment the CHT 500 is modified. In one embodiment, leaf page pointers are interleaved within the bitmap array 510 in the same way as the prefix counts. To make space for this additional information, in one embodiment the size of each bitmap is increased from 32 to 64 bits. As a result there are 64 bits per bucket, of which 48 are used for leaf pointers and 16 are used for prefix counts. All entries that hash to a bitmap bucket are stored on the same leaf. Further, the prefix count is now relative to the beginning of the leaf, which is why 16 bits for it are sufficient. When building the data structure, as many consecutive bitmap buckets as possible are assigned to a leaf. As a result usually all but the last leaves are almost full.

In one embodiment, another modification to the CHT 500 concerns how over-flows, which occur due to duplicate keys or hash collisions, are handled. In one embodiment, the original CHT 500 scheme is optimized for unique keys: once both possible locations for an item have been taken, this entry was stored in a totally different data structure. In one example, an approach is used that keeps overflow entries close to regular entries. As a result, in one embodiment, the hash index works well not only for unique keys, but also when there are multiple TSNs per key.

In one example, the 39 bits of the hash and a 48 bit TSN are stored. These values are optimized for 32 KB pages and 8B pointers: Extendible Hashing pre-determines 12 hash bits (due to a fanout of 4096), and the modified CHT 500 bitmap page predetermines an additional 11 bits (due to 2048 buckets). As a result, 23 bits of the hash can be "compressed," so that each leaf page entry only has to store the remaining 16 bits. If the 48 bit TSN bits are added, each leaf entry is only 8 bytes in total.

Figure 6:
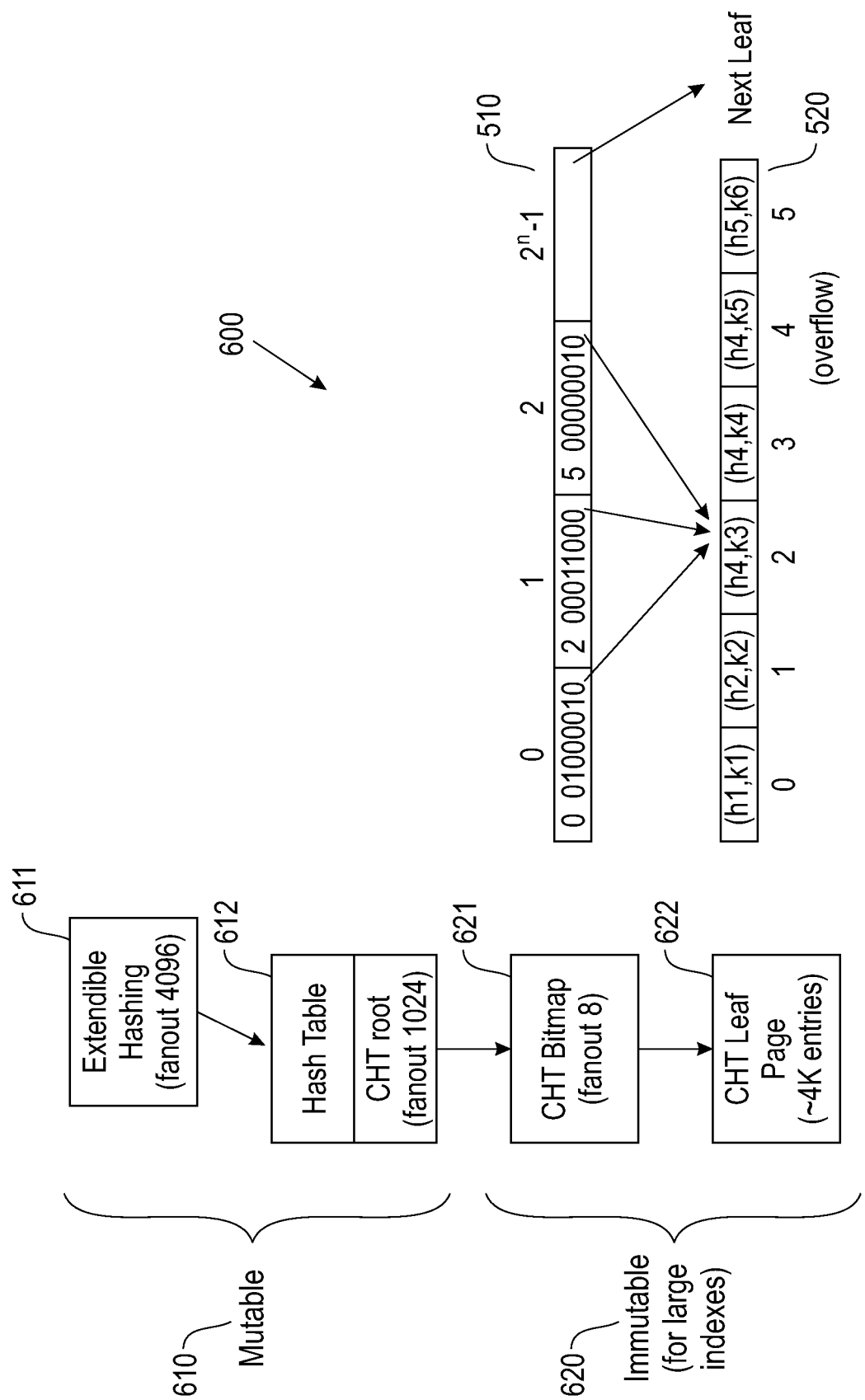
FIG. 6 illustrates an example data structure, according to an embodiment.

FIG. 6 illustrates an example data structure 600, according to an embodiment. In one embodiment, the data structure 600 includes a mutable tier 610 that includes extendible hashing 611, and a hash table 612, and an immutable tier 620 that includes a CHT bitmap 621 (e.g., modified bitmap array 510) and a CHT leaf page 622. In one embodiment, leaf page pointers are interleaved within the bitmap array 510 in the same way as the prefix counts. To make space for this additional information, in one embodiment the size of each bitmap is increased from 32 to 64 bits. As a result there are 64 bits per bucket, of which 48 are used for leaf pointers and 16 are used for prefix counts. All entries that hash to a bitmap bucket are stored on the same leaf. Further, the prefix count is now relative to the beginning of the leaf, which is why 16 bits for it are sufficient. When building the data structure, as many consecutive bitmap buckets as possible are assigned to a leaf. As a result usually all but the last leaves are almost full.

In one embodiment, another modification to the CHT 500 concerns how over-flows, which occur due to duplicate keys or hash collisions, are handled. In one embodiment, the data structure 600 scheme is optimized for unique keys: once both possible locations for an item have been taken, this entry was stored in a totally different data structure. In one example, an approach is used that keeps overflow entries close to regular entries. As a result, in one embodiment, the hash index works well not only for unique keys, but also when there are multiple TSNs per key.

In one example, the 39 bits of the hash and a 48 bit TSN are stored. These values are optimized for 32 KB pages and 8B pointers: Extendible Hashing pre-determines 12 hash bits (due to a fanout of 4096), and the modified CHT 500 bitmap page predetermines an additional 11 bits (due to 2048 buckets) in the data structure 600. As a result, 23 bits of the hash can be "compressed," so that each leaf page entry only has to store the remaining 16 bits. If the 48 bit TSN bits are added, each leaf entry is only 8 bytes in total.

To utilize modern hardware effectively, low-overhead synchronization of index structures is of upmost importance. The traditional approach in B-Trees is to use fine-grained latching: each index page stores a read/write latch, which allows multiple concurrent readers but only a single writer. Unfortunately, this simple approach does not work well on modern CPUs, so some modern systems use complex non-blocking (or latch-free) data structures.

In one embodiment, readers proceed without acquiring any latches, i.e., in a non-blocking fashion; and writers acquire fine-grained latches, but only for those pages that they are likely to modify. In one embodiment, read-heavy workloads scale perfectly, and writes only acquire latches on those pages where physical contention is likely. The advantage of having write latches is that they allow for much more flexibility in designing data structures in comparison with a lock-free approach. Examples of operations that are possible with one or more embodiments, but would be difficult with lock-free structures include:

completely reorganizing (e.g. compactify) a page by latching out other writers and replacing it with a compactified new version; and
  create a meaningful snapshot of a page by first latching it and then creating a temporary copy. At this point the latch can be released and the copy may be written out to persistent storage.

In one example, writers have to make sure that reads may always proceed safely. In one example, a synchronization protocol during insertion may be implemented following the pseudo code example shown below:

```
insert(hash, tsn)
   (dict, globalDepth) = getDictAndDepth( )
   ht = dict[getBits(hash, globalDepth)]
   ht.latch.lock( )
   if (ht.isObsolete)            // Case 0
      ht.latch.unlock( )
      return insert(hash, tsn) //retry
   if (ht.insert(hash, tsn))     // Case 1
      ht.latch.unlock( )
      return // success
   if (ht.localDepth < globalDepth)  // Case 2
      ht.isObsolete = true
      (ht1,ht2) = ht.split( )
      increaseLocalDepth(hash, ht, ht1, ht2)
      ht.latch.unlock( )
      return insert(hash, tsn) //retry
   if (globalDepth < MaxDepth)   // Case 3
      increaseGlobalDepth(globalDepth) ht.latch.unlock( )
      return insert(hash, tsn) //retry
   newHt = new ChainingHT(globalDepth, ht) // Case 4
   newHt.insert(hash, tsn)
   dict[dictIndex] = newHt
   ht.isObsolete = true ht.latch.unlock( )
   newHt.l2.merge(ht)
   return //success
```

In one embodiment, after finding the chaining hash table using the global depth and the dictionary, the latch for the hash table is acquired. The following four use cases may be implemented by one or more embodiments:

Case 1: The insert into the index page succeeded;
  Case 2: The local depth must be increased;
  Case 3: The global depth must be increased; and
  Case 4: A CHT merge is required.

In one embodiment, Case 1 is the most common and there is space on the index page, so an entry is added to the page while holding its latch. But since readers do not acquire this latch, writers have to make sure that concurrent reads are correct. In one example, this is achieved by making all intra-page pointers (the "chain" array and the "next" pointers in all entries) atomic. Additionally, deletion can only be performed in a logical fashion by removing an entry from its list, but not reusing its entry position for later insertions. If there had been a significant number of deletions in a page, it is beneficial to create a compacted version of the page instead of performing a split. In the remaining Cases 2, 3, and 4, the index page is full.

In one example, in Case 2 the local depth can be increased since it is less than the global depth. First, the (full) index page is split by creating two new pages. The increaseLocalDepth function then changes the dictionary pointers to point to the new pages. Note that for readers it is immaterial if they arrive at the new or old (unsplit) page. Further, other insert operations into this hash group are excluded by the latch, which is still being held. There might, however, be an insertion into another hash group that triggers growth of the dictionary (Case 3) at this point in time. To protect against this case the increaseLocalDepth function (not shown in the pseudo code) acquires the dictionary latch. It is important to note that this coarse-grained latch is only acquired when the local or global depth increases, not during Case 1.

In one example, in Case 3 the global depth must be increased, before a split (Case 2) can be performed. The increaseGlobalDepth function (not shown in the pseudo code above) acquires the dictionary latch, then creates a new dictionary by copying over the pointer appropriately. If there is enough space on the same dictionary page, the new dictionary is appended (do not overwrite) after the previous one. Once this is finished, the global dictionary pointer is set to this new dictionary, this pointer encodes both the dictionary and the global depth. This is a relatively intrusive operation since it prevents concurrent split operations. However, one property of Extendible Hashing is that lookups and the most inserts (Case 1) are not affected by dictionary growth. Further, Case 3 occurs only twelve times in total, takes only around 10,000 cycles for a maximum depth of twelve, and never again occurs for large indexes.

In one example, Case 4 happens when the local depth (and therefore also the global depth) is at the maximum, which means that the CHT structure (FIG. 6) must be rebuilt by merging the older CHT structure and the full index page. In order to allow for concurrent inserts during this merge, first a new empty page is installed, which points to the full page that needs to be merged. At this point, the latch can be released and the merge process can start. The immutability of the CHT structure is very beneficial for concurrency: during its construction, which is performed in a single operation/thread, the older CHT structure is not modified and can still be queried. Once the construction of a new CHT is finished, a single atomic store is performed to the corresponding index page to make the new CHT visible. No latches or other atomic operations are required.

In one embodiment, a special Case 0 exists. While a page has been split or is being merged, other insert or delete operations might have waited on its latch. Once these operations finally get the latch they are "too late" and this index page is obsolete. Case 0 handles this situation by restarting the operation. It should be noted that it is highly unlikely that Case 0 occurs repeatedly for the same operation, because both split and merge create new space at the desired location.

In one or more embodiments, in the synchronization protocol lookup operations may proceed without acquiring any latches, resulting in speed close to unsynchronized data structures. Insert and delete operations usually acquire only a single latch. This single latch is located on the page that will be changed, i.e., where some physical contention is likely. As a result, one or more embodiments scale extremely well on modern multi-core CPUs.

Figure 7:
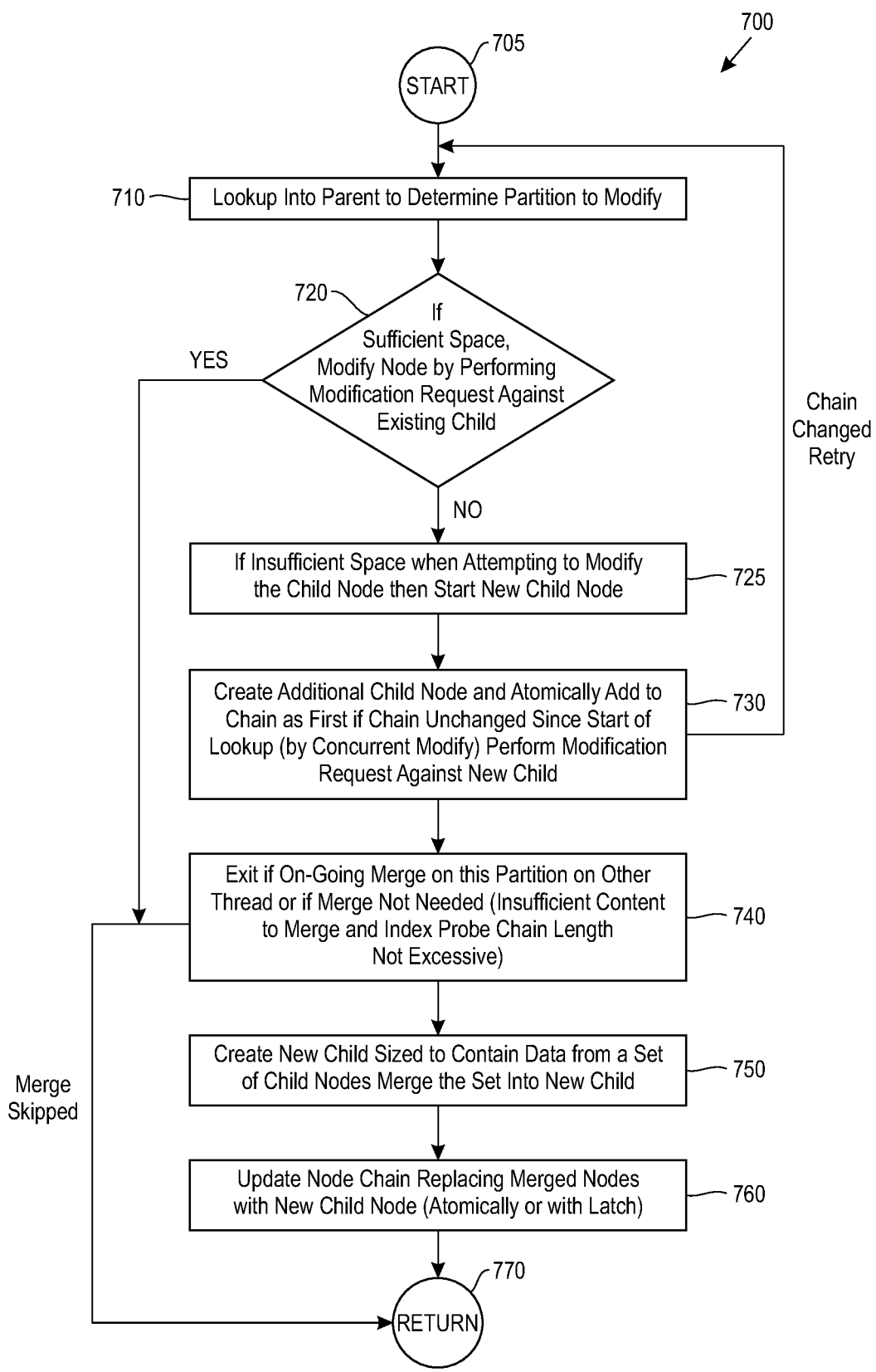
FIG. 7 illustrates a process for a modify operation on a child node that transforms the child node, according to an embodiment.

FIG. 7 illustrates a process 700 for a modify operation on a child node that transforms the child node (Case 4), according to an embodiment. In one embodiment, the process 700 commences at the start block 705 and proceeds to block 710. In block 710, a lookup operation is performed to determine a partition to modify. In block 720, if there is sufficient space, the node is modified by performing a request against the existing child and then process 700 proceeds to block 770. In block 725, if insufficient space exists in the child node when attempting to modify the child node, the new child node creation is started and process 700 proceeds to block 730. In block 730, the additional child node is created and atomically added to a chain as a first time if the chain is unchanged since the start of the lookup operation (e.g., by a concurrent modify operation) and a modification request is performed against the new child node.

In one embodiment, in block 740 the process 700 exits to block 770 if there is an on-going merge on the partition on another operation/thread or if a merge is unnecessary (e.g., there is insufficient content to merge, and the index probe chain length is not excessive), otherwise process 700 continues to block 750. In block 750 a new child is created and sized to contain data from a set of child nodes, and the set of child nodes is merged into the new child node. In block 760 the node chain is updated by replacing merged nodes with a new child node (atomically or with a latch). Process 700 then proceeds to block 770 for ending the current process and waiting to begin again.

Figure 8A:
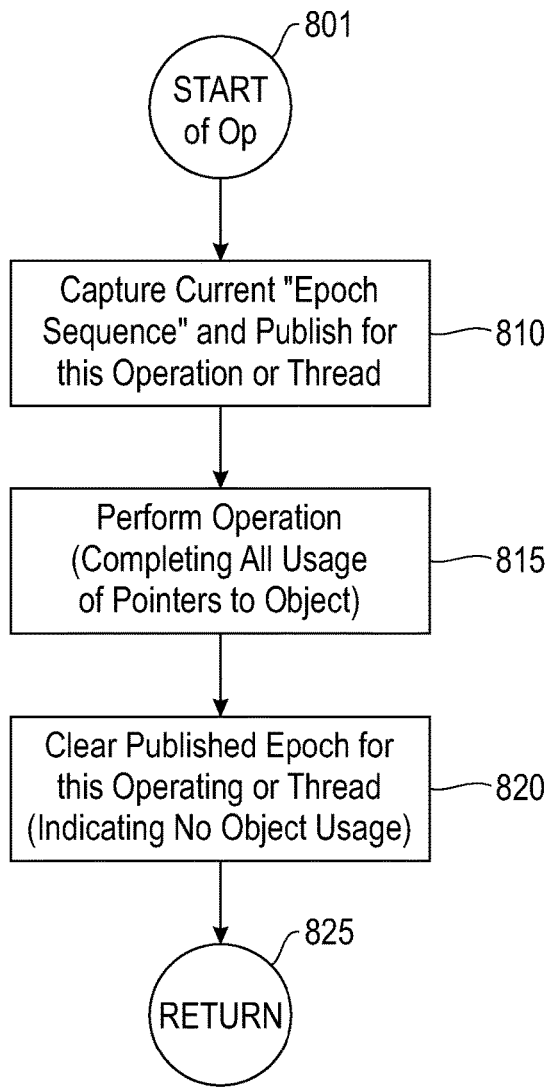
FIG. 8A-C illustrates epoch processing for reclaiming node space, according to an embodiment.
Figure 8B:
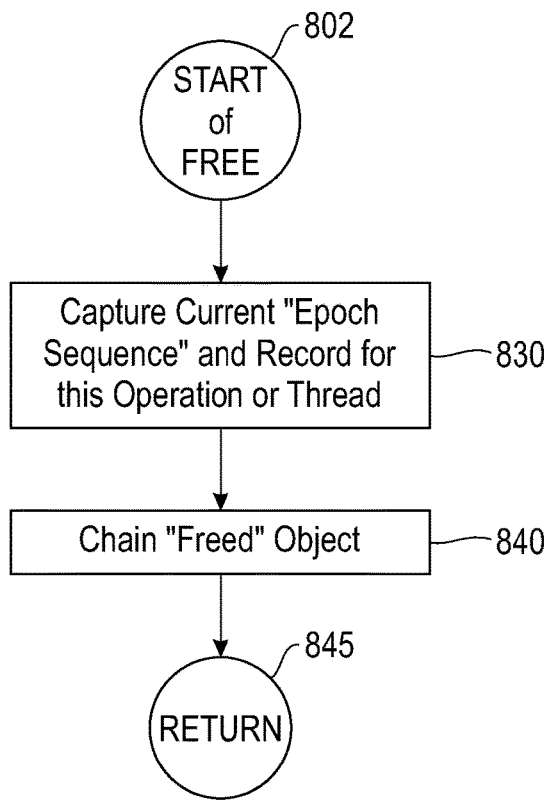
Figure 8C:
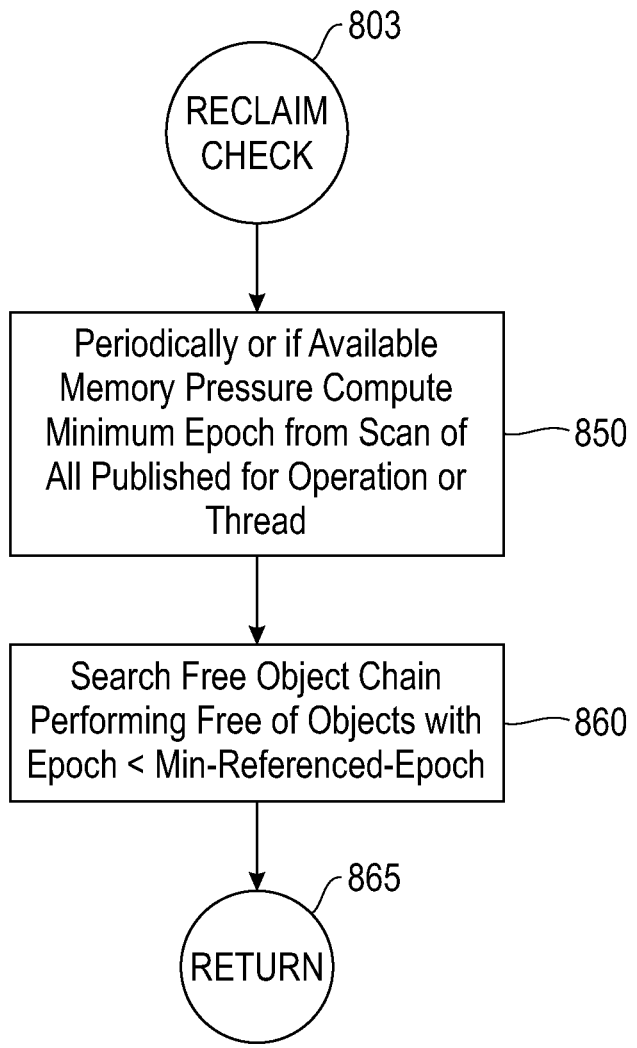

FIG. 8A-C illustrates epoch processing for reclaiming node space, according to an embodiment. If a page is removed from the index it is not immediately freed. Instead, the page is annotated with the current global epoch and stored on a list of pages to be freed later. Every time the global epoch advances a global atomic flag is set, which indicates that memory reclamation might be beneficial. Memory reclamation is performed by first computing the minimum of all local epochs. Then the epochs of all pages that are meant to be freed eventually are scanned. Pages with an epoch less than the previously determined minimum can immediately be freed.

The global epoch should not be updated too frequently (e.g., every 1 ms is adequate), so that its cache line is usually cache resident in all processing cores. Additionally, operations/threads should only update their local epoch counter when the global epoch counter has changed. This scheme would be correct—but slow—if the global counter is incremented on each operation. Finally, this scheme works well if all index operations are relatively quick. For example, processing disk I/O while staying in an epoch would prohibit any memory reclamation during this time. Therefore, if an index page is not in RAM, the index operation must be aborted and the local epoch should be set to infinity.

In one example, in FIG. 8A a process for capturing and clearing an epoch for a start of a data structure operation. In block 801, a hierarchical data structure operation is started. In block 810, the current epoch sequence is captured and published for the operation or thread. In block 815, the operation is performed (e.g., an insert, modify, etc.) on the hierarchical data structure (e.g., CHT 600, FIG. 6), completing all usage of pointers to objects. In block 820, the published epoch for the operation or thread is cleared (indicating no object usage). In block 825, the process returns or ends.

In one example, in FIG. 8B a process for freeing an object is performed. In block 802, the process for freeing an object commences. In block 830, the current epoch sequence is captured and recorded for the operation or thread. In block 840, the "freed" object is chained. In block 845, the process returns or ends.

In one example, in FIG. 8C a process for a reclaiming check is performed. In block 803, the reclaim process commences. In block 850, either periodically or based on memory pressure, a minimum epoch is determined from a scan of all published epochs for an operation or thread. In block 860, a search is conducted on the free object chain performing freeing of objects with epoch<minimum-referenced-epoch. In block 865, the process returns or ends.

Figure 9:
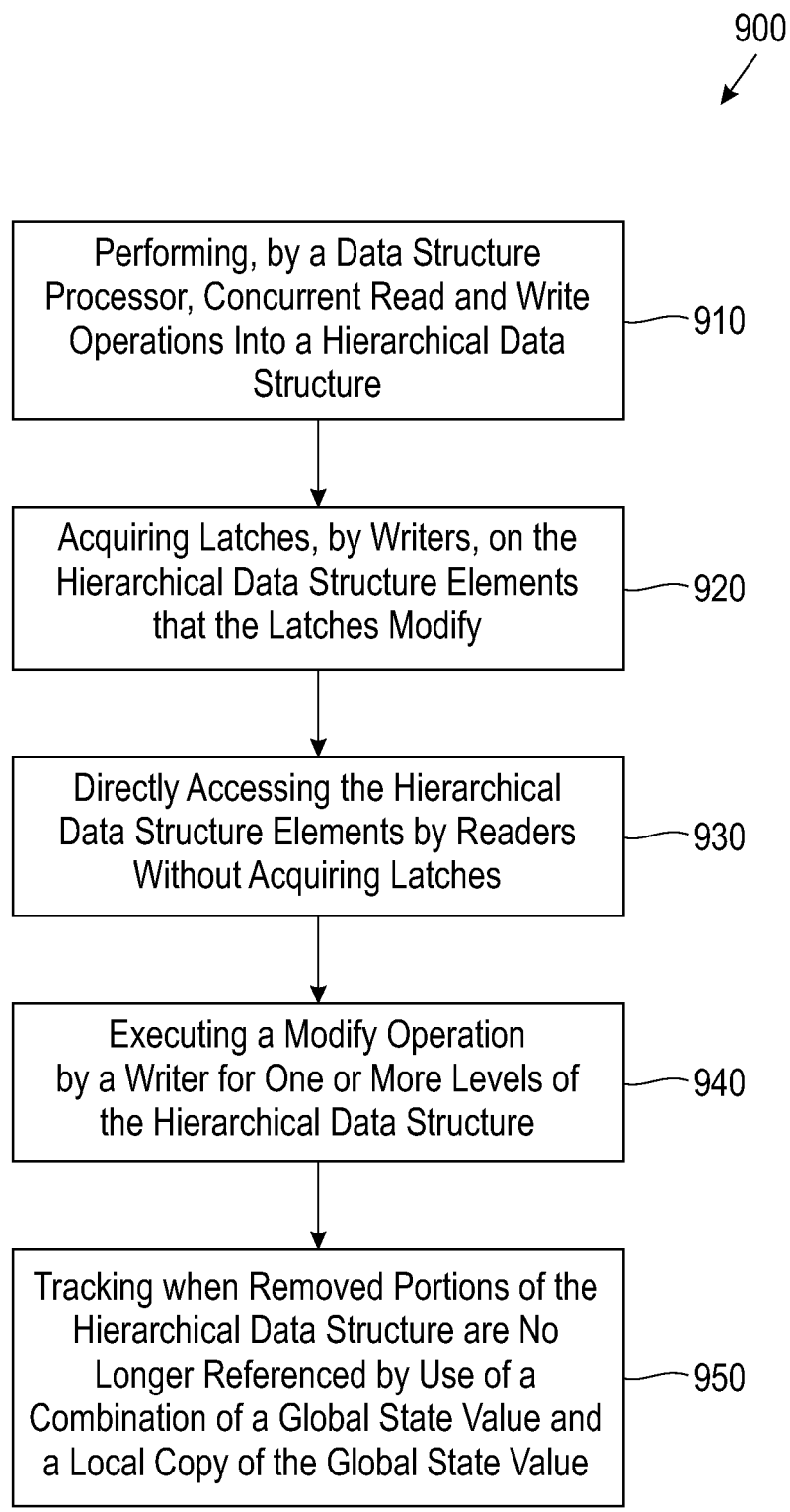
FIG. 9 is a block diagram of a process for concurrent read and write operations into a hierarchical data structure, according to an embodiment.

FIG. 9 is a block diagram of a process 900 for concurrent read and write operations into a hierarchical data structure, according to an embodiment. In one embodiment, in block 910 the process 900 performs concurrent read and write operations into a hierarchical data structure. In block 920 the process 900 acquires latches, by writers, on the hierarchical data structure elements that the latches modify. In one embodiment, in block 930 the hierarchical data structure elements are directly accessed by readers without acquiring latches. In block 940, a modify operation is executed by a writer for one or more levels of the hierarchical data structure. In one embodiment, in block 950 process 900 includes tracking when removed portions of the hierarchical data structure are no longer referenced by use of a combination of a global state value and a local copy of the global state value.

In one example, the hierarchical data structure elements include a parent node and multiple child nodes. In one example, the nodes represent pages. In one embodiment, the modify operation includes instructions for performing a lookup into the parent node for determining a partition to modify, forming a first new child node of the parent node if there is insufficient space for modifying a full child node, and inserting the first new child node before the full child node in a node chain. In one example, inserting of the first new child node includes atomically adding the first new child node first to the node chain when the node chain is unchanged since starting the lookup, and directly performing a modify on the first new child node using a reader-wait-free protocol.

In one embodiment, process 900 may include exiting execution for the modify operation for an on-going merge on the partition on another modify operation or if merging on the partition is unnecessary. In one example, a second new child node sized for holding data from a set of child nodes is created. The set of child nodes is merged into the second new child node, and the node chain is updated by replacing merged nodes with the second new child node.

In one embodiment, process 900 may further include incrementing a global epoch counter periodically, where each modify operation updates a local copy of the global epoch counter at a start of each operation or once per a batch of operations. In one example, process 900 may further include recording a value of the global epoch counter for an old version of a child node, and reclaiming node space by freeing the old version of the child node after all other modify operations have a local epoch counter value that exceeds the value of the recorded global epoch counter. In one embodiment, process 900 may further include maintaining the global state value by periodic update using timer signals or driven during read and modify actions comprising incrementing a counter or capture of a system time value. In one example, a "trigger" is employed for the change to the global sequence, such as timer based (e.g., every one second, etc.), or based on calls used by read and modify operations (e.g., calls to getLocalState). In one example, two types of global states may be used, for example a time stamp and a simple counter.

In one example, process 900 may provide that writer operations that are restricted to a single hierarchical data structure element are performed directly. In another example, writer operations that split an original hierarchical data structure element into two or more hierarchical data structure elements are performed by forming separate split hierarchical data structure elements, and leaving the original hierarchical data structure element unchanged for access by any concurrent readers.

As will be appreciated by one skilled in the art, aspects of the embodiments may be embodied as a system, method or computer program product. Accordingly, aspects of the embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the embodiments may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the embodiments may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the embodiments are described below with reference to flowchart illustrations and/or block diagrams of methods, apparatus (systems) and computer program products according to the embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

References in the claims to an element in the singular is not intended to mean "one and only" unless explicitly so stated, but rather "one or more." All structural and functional equivalents to the elements of the above-described exemplary embodiment that are currently known or later come to be known to those of ordinary skill in the art are intended to be encompassed by the present claims. No claim element herein is to be construed under the provisions of 35 U.S.C. section 112, sixth paragraph, unless the element is expressly recited using the phrase "means for" or "step for."

The terminology used herein is for the purpose of describing particular embodiments only and is not intended to be limiting of the embodiments. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the embodiments has been presented for purposes of illustration and description, but is not intended to be exhaustive or limited to the embodiments in the form disclosed. Many modifications and variations will be apparent to those of ordinary skill in the art without departing from the scope and spirit of the embodiments. The embodiments were chosen and described in order to best explain the principles of the embodiments and the practical application, and to enable others of ordinary skill in the art to understand the various embodiments with various modifications as are suited to the particular use contemplated.

What is claimed is:

1. A method comprising:
    performing, by a data structure processor, concurrent read and write operations into a hierarchical data structure that comprises a mutable tier including extendible hashing, a hash table, and an immutable tier including a concise hash table (CHT) bitmap;
    acquiring latches, by writers, on the hierarchical data structure elements that the writers modify;
    directly accessing the hierarchical data structure elements by readers without acquiring latches;
    executing a modify operation by a writer for one or more levels of the hierarchical data structure; and
    tracking when removed portions of the hierarchical data structure are no longer referenced by use of a combination of a global state value and a local copy of the global state value.

2. The method of claim 1, wherein the modify operation comprises performing a lookup into a parent node for determining a child node to modify, the child node including a linked list, and the modify inserts new entries to the linked list by atomically modifying linked list next pointers.

3. The method of claim 2, wherein:
    maintaining the global state value by periodic update using timer signals or driven during read and modify actions comprising incrementing a counter or capture of a system time value.

4. The method of claim 3, wherein the modify operation further comprises:
    forming a new child node of the parent node upon a determination that there is insufficient space for modifying a full child node and inserting the new child node in the node chain.

5. The method of claim 4, wherein inserting of a first new child node comprises adding the first new child node to the node chain when the node chain is unchanged since starting the lookup.

6. The method of claim 5, further comprising:
    creating a second new child node sized for holding data from a set of child nodes;
    merging the set of child nodes into the second new child node; and
    updating the node chain by replacing merged nodes with the second new child node.

7. The method of claim 3, further comprising:
    maintaining the local state value that is updated by copying the global state value before any forming any references to entries within the hierarchical data structure and clearing the local state value when no operation is in progress locally; and
    reclaiming space by freeing the no longer referenced portions of the hierarchical data structure after all operations have a local state value that occurs later in the sequence than the tagged value for the portion to be reclaimed.

8. The method of claim 3, wherein:
    modify operations that are restricted to a single hierarchical data structure element are performed directly; and
    modify operations that split an original hierarchical data structure element into two or more hierarchical data structure elements are performed by forming separate split hierarchical data structure elements.

9. A computer program product for concurrent read and write operations for hierarchical data structure elements, the computer program product comprising a non-transitory-_computer readable storage medium having program code embodied therewith, the program code executable by a processor to:
    perform, by the processor, concurrent read and write operations into a hierarchical data structure that comprises a mutable tier including extendible hashing, a hash table, and an immutable tier including a concise hash table (CHT) bitmap;
    acquire, by writers, latches on the hierarchical data structure elements that the writers modify;
    directly access, by the processor, the hierarchical data structure elements by readers without acquiring latches;
    execute, by the processor, a modify operation by a writer for one or more levels of the hierarchical data structure; and
    track, by the processor, when removed portions of the hierarchical data structure are no longer referenced by use of a combination of a global state value and a copied local state value.

10. The computer program product of claim 9, wherein the modify operation comprises program code executable by the processor to:
    perform, by the processor, a lookup into a parent node for determining a child node to modify, the child node including a linked list, and the modify inserts new entries to the linked list by atomically modifying linked list next pointers.

11. The computer program product of claim 10, wherein:
    maintain the global state value by periodic update using timer signals comprising incrementing a counter or capture of a system time value.

12. The computer program product of claim 11, wherein the modify operation further comprises program code executable by the processor to:
    determining a partition to modify; and
    form a first new child node of the parent node upon a determination that there is insufficient space for modifying a full child node and insert the first new child node before the full child node in a node chain.

13. The computer program product of claim 12, wherein inserting of the first new child node comprises adding the first new child node first to the node chain when the node chain is unchanged since starting the lookup.

14. The computer program product of claim 13, further comprising program code executable by the processor to:
    create a second new child node sized for holding data from a set of child nodes;

merge the set of child nodes into the second new child node; and update the node chain by replacing merged nodes with the second new child node.

15. The computer program product of claim 11, further comprising program code executable by the processor to:

maintain the local state value that is updated by copying the global state value before any caching of pointers to entries within the hierarchical data structure and clearing the local state value when no operation is in progress locally; and reclaim space by freeing the no longer referenced portions of the hierarchical data structure after all operations have a local state value that exceeds the value of the recorded global state value for the portion to be reclaimed.

16. The computer program product of claim 11, wherein:

writer operations that are restricted to a single hierarchical data structure element are performed directly; and writer operations that split an original hierarchical data structure element into two or more hierarchical data structure elements are performed by forming separate split hierarchical data structure elements.

17. An apparatus comprising:

a memory storing instructions; and at least one processor configured to execute the instructions to:

perform concurrent read and write operations into a hierarchical data structure that comprises a mutable tier including extendible hashing, a hash table, and an immutable tier including a concise hash table (CHT) bitmap;

acquire latches, by writers, on the hierarchical data structure elements that the writers modify;

directly access the hierarchical data structure elements by readers without acquiring latches;

execute a modify operation by a writer for one or more levels of the hierarchical data structure; and track when removed portions of the hierarchical data structure are no longer referenced by use of a combination of a global state value and a local copy of the global state value.

18. The apparatus of claim 17, wherein the modify operation comprises performing a lookup into a parent node for determining a child node to modify, the child node including a linked list, and the modify inserts new entries to the linked list by atomically modifying linked list next pointers.

19. The apparatus of claim 18, wherein:

the modify operation further comprises forming a new child node of the parent node if there is insufficient space for modifying a full child node.

20. The apparatus of claim 19, wherein:

inserting a new child node in the node chain for the child node; and inserting of the first new child node comprises adding the new child node to the node chain when the node chain is unchanged since starting the lookup.

* * * * *